INVENTOR.
GORDON C. GODEJAHN JR
BY
A. M. Fernandez
ATTORNEY

INVENTOR.
GORDON C. GODEJAHN JR.
BY A. M. Fernandez
ATTORNEY

United States Patent Office 3,401,450

Patented Sept. 17, 1968

3,401,450

METHODS OF MAKING A SEMICONDUCTOR STRUCTURE INCLUDING OPPOSITE CONDUCTIVITY SEGMENTS

Gordon C. Godejahn, Jr., Santa Ana, Calif., assignor to North American Rockwell Corporation Original application July 29, 1964, Ser. No. 385,890, now Patent No. 3,312,879, dated Apr. 4, 1967. Divided and this application July 21, 1966, Ser. No. 578,901
6 Claims. (Cl. 29—580)

This is a division of application Ser. No. 385,890, filed July 29, 1964, now Patent No. 3,312,879.

This invention relates to methods of making a crystalline structure having electrically isolated semiconductor segments of opposite conductivity type, and more particularly to methods of producing a crystalline substrate with embedded semiconductor segments which have been so derived from N and P-type high quality, single crystal, semiconductor wafers that desired electrical characteristics are provided for the segments from which integrated circuit devices are to be fabricated.

Epitaxial-diffused and triple-diffused structure have been employed in the past to fabricate monolithic integrated circuits having opposite conductivity type semiconductor devices such as paired NPN and PNP transistors. For instance, starting with a single-crystal wafer of one conductivity type, such as N-type silicon, the collector base and emitter regions of one transistor are diffused, while only the base and emitter of the outer transistor are diffused. The result is the production of two transistors not properly matched because the diffused collector of one is provided with a graded impurity profile while the grown collector of the other is provided with a uniformly distributed impurity profile. In the fabrication of the ideally matched NPN and PNP transistors, it would be advantageous to start with a single-crystal semiconductor having adjacent N and P regions of uncompensated, homogeneous resistivity.

An object of this invention is to provide methods of fabricating a monolithic-like crystalline structure having at least two single-crystal semiconductor segments of opposite conductivity types with uncompensated homogeneous resistivity on a common substrate.

A further object is to provide methods of making electrically isolated single-crystal semiconductor segments of opposite conductivity types on a common substrate of thermally compatible isolating material.

Still another object is to provide methods of producing segments of single-crystal semiconductor wafers of opposite conductivity types joined by thermally compatible isolating material on a common substrate.

In accordance with one embodiment of the invention, N and P-type single-crystal Czochralski-grown or Float Zoned silicon segments are joined in a monolithic-like structure by vapor deposited silicon. It should of course be understood that other thermally compatible, isolating material may be vapor deposited, such as beryllium oxide, in combination with any of the semiconductive materials known to be suitably adapted to the fabrication of devices for integrated circuits, such as germanium. By thermal compatibility it is meant that the thermal characteristics of the isolating material be matched closely enough to the characteristics of the semiconductor employed so that deleterious stresses, strains, separations, fractures or deformations will not result, either in the isolating material or the semiconductor, during the process of fabrication of, for example, diffused junctions at temperatures in the range of 700 to 1300° C., and the structure and functioning of the circuit fabricated is not impaired as a consequence of wide variations in processing and operating temperatures.

In the preferred embodiment of the invention, each segment is coated with an insulating film of thermally compatible material on all surfaces except its obverse side to improve the electrical isolation between segments. Although an oxide film, such as silicon dioxide, is employed in the preferred embodiment, it should be understood that other insulating materials, such as a silicon nitride, may be employed. This isolating material deposited on the oxidized segments to join them in a monolithic-like structure is preferably silicon, particularly if silicon is selected for the semiconductor segments but, as noted hereinbefore, other isolating materials may be employed and the insulating film which improves isolation need not be provided where adequate isolation is provided by the joining material, as by providing a sufficiently thick deposit of beryllium oxide between the segments.

Since Czochralski wafers have a radial resistivity gradient, it is desirable to obtain the semiconductor segments to be joined at the same radius from the center of the respective wafers. Once the segments are thus selected, they may be joined in an arbitrary pattern. However, for purposes of simplicity, the preferred embodiment of the invention will be illustrated by a process in which the N and P-type segments are selected from two different Czochralski-grown crystal wafers at the same radius and joined in a symmetrical pattern.

The invention may be better understood from the following description of illustrative processes of fabrication with reference to the drawings in which.

Figure 1:
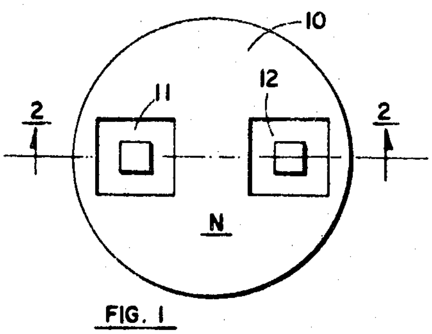
FIGURES 1 to 5 illustrate in various stages of fabrication a semiconductor wafer of one conductivity type from which segments are prepared for joining with segments of a semiconductor wafer of another conductivity type.

As just noted, the basic steps of two illustrative processes for joining isolated segments of N and P-type semiconductor crystals in a monolithic-like structure are shown in the drawings. In general, the first process consists principally of: (1) selecting two opposite conductivity type wafers of the appropriate resistivity; (2) isolating segments of the N-type semiconductor in an arbitrarily selected pattern; (3) producing an arbitrarily selected pattern of holes in the N-type semiconductor and a corresponding array of mesas in the P-type semiconductor; (4) placing the mesas of the P-type semiconductor in the holes of the N-type semiconductor and, through the reverse side of the N-type semiconductor, joining the mesas of the P-type semiconductor to the N-type semiconductor by depositing isolating crystalline materials; (5) and finally removing, as by lapping or etching, the P-type semiconductor material joining the mesas until the isolated N-type semiconductor segments are exposed and the mesas emerge as isolated P-type semiconductor segments on the obverse side of the structure.

Figure 2:
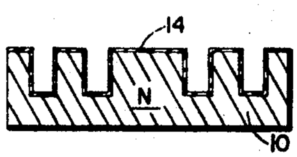
Figure 3:
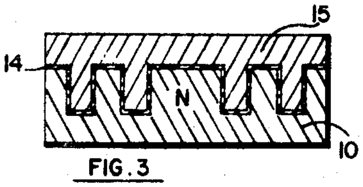
Figure 4:
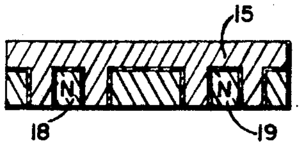

The process for isolating segments of an N-type semiconductor wafer 10 comprises the steps of; (a) forming grooves or isolating channels 11 and 12 on the reverse side of the wafer in a pattern outlining the desired semiconductor segments as shown in FIGURE 1; (b) oxidizing the reverse side of the semiconductor wafer including the surfaces of the isolating channels to provide an electrically insulating film 14 as shown in FIGURE 2 in a cross-section taken on the line 2—2 of the semiconductor wafer of FIGURE 1; (c) depositing an isolating material 15 on the insulating film 14 as shown in FIGURE 3; and (d) removing a part of the semiconductor 10 from its obverse side to expose the isolating material in the channels around the desired N-type semiconductor segments 18 and 19 as shown in FIGURE 4.

The details of that process for electrically isolating segments of a semiconductor wafer are more fully described in a co-pending application Ser. No. 339,717 filed by McWilliams et al. on Jan. 23, 1964 and assigned to the assignee of this application. Briefly, in a preferred process for isolating the segments 18 and 19 on a common crystalline substrate 15, the first step consists of etching the isolating channels 11 and 12 in the N-type silicon single crystal wafer 10 which is then oxidized to provide a silicon dioxide insulating film. A substrate or crystalline silicon is then vapor deposited on the oxide film. As noted in the aforementioned co-pending application, the insulating film may be silicon nitride instead of silicon dioxide and the isolating substrate material may be any other thermally compatible, vapor deposited crystalline material such as beryllium oxide or alumina. As further noted in that co-pending application, the insulating film of silicon dioxide or silicon nitride may be omitted, particularly if the isolating material employed sufficiently high resistivity, such as beryllium oxide. The last step in isolating segments of the semi-conductor wafer 10 is to lap back the obverse side of the wafer 10 until the substrate material is exposed in the isolating channels. Immediately the obverse side of the resulting structure shows the isolated segments 18 and 19 embedded in the isolating substrate material 15 with an electrically isolating film 14 on all embedded sides of the segments as shown in FIGURE 5.

If desired, a low-resistivity $N^+$ layer may be provided, as by diffusion, on the reverse side of the wafer 10 before the isolating channels are etched.

Figure 5:
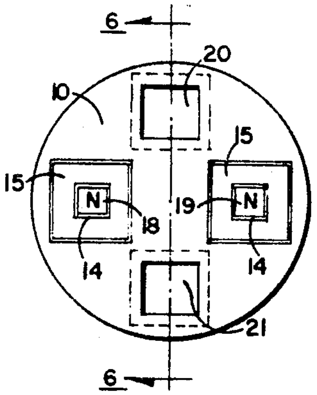

To produce electrically isolated semiconductor segments of the P-type joined with the segments 18 and 19 of the N-type in a monolithic-like crystalline structure having a common substrate, the next step of the first process is to cut holes 20 and 21 through the structure of FIGURE 5 in the arbitrary pattern desired for the placement of the P-type semiconductor segments. In this illustrative process, a P-type Czochralski grown or Float Zoned, single-crystal silicon wafer of approximately the same diameter as the N-type wafer 10 is selected for the P-type segments. Since such wafers have a radial resistivity gradient, the P-type segments are to be taken from the P-type wafer preferably at approximately the same radius as the N-type segments 18 and 19 isolated from the wafer 10. In that manner, the P and N-type segments joined together in a monolithic-like structure will have the same resistivity characteristics.

Figure 6:
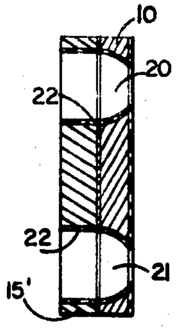
FIGURES 6 to 9 illustrate in various stages of fabrication the steps of preparing semiconductor segments of the other conductivity type and joining those segments with the semiconductor segments of the first conductivity type.
Figure 7:
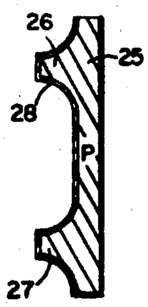

FIGURE 7 illustrates a cross-section of a P-type silicon wafer 25 with two mesas 26 and 27 etched on the reverse side thereof at positions which correspond to positions of the holes 20 and 21 in the structure of FIGURE 5. The etched side of the P-type silicon wafer 25 is oxidized to provide a silicon dioxide film 28 over the mesas 26 and 27. As with the N-type wafer 10, a low resistivity $P^+$ layer may be provided on the reverse side of the wafer 25 before etching and oxidizing the mesas 26 and 27. FIGURE 6 shows a cross-section taken on the line 6—6 of the resulting structure shown in FIGURE 5. The cross section views of FIGURES 6 and 7 are shown with the obverse side of the structure of FIGURE 6 facing the reverse or mesa side of the P-type silicon wafer of FIGURE 7.

Figure 8:
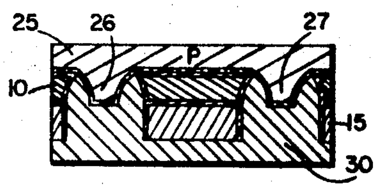

The next step in the process is to place the mesas 26 and 27 into the holes 20 and 21 with the obverse side of the structure in FIGURE 6 facing the reverse side of the structure in FIGURE 7, and then deposit isolating material 30 around the mesas through the reversed side of the structure of FIGURE 5 as shown in FIGURE 8. The isolating material may be vapor deposited silicon. It surrounds the mesas 26 and 27 as well as the isolating material 15 deposited on the N-type wafer 10 in the step illustrated in FIGURE 3 and all of the oxidized N-type wafer 10.

Figure 9:
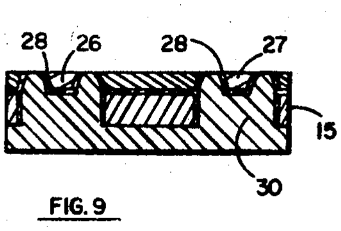
Figure 10:
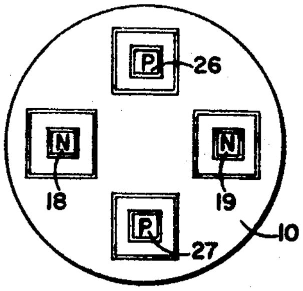
FIGURE 10 shows the semiconductor segments of opposite conductivity type joined by isolating material on a monolithic-like crystalline structure.

In the next step the obverse side of P-type wafer 25 is cut back as by etching or lapping to expose the deposited isolating material 30 surrounding the mesas 26 and 27, thereby leaving the mesas as isolated P-type segments embedded in the isolating material 30. Since the isolating material 15 deposited in the step illustrated by FIGURE 3 is the same as the isolating material 30 deposited in the step illustrated by FIGURE 8, it may be seen that the P-type segments 26 and 27 are joined to the N-type segments 18 and 19 by an isolating material 30 which provides a common crystalline substrate as shown in FIGURE 9. The obverse side of the resulting structure of FIGURE 9 is illustrated in FIGURE 10.

In practice, a larger number of isolated semiconductor segments of opposite conductivity types would be joined in a monolithic-like structure. In that regard, it should be noted that the dimensons and proportions used in the drawings were selected for ease of illustration only and are not to be taken as representative of proportionate dimensions employed in the actual fabrication of such isolated semiconductor segments.

The second process of producing isolated semiconductor segments of opposite conductivity type in a monolithic-like crystalline structure is illustrated in various stages of fabrication by FIGURES 11 to 18. It differs from the first process described with reference to FIGURE 1 to 10 in that the P-type segments are isolated in a monolithic-like crystalline structure before the N-type segments are isolated.

Figure 11:
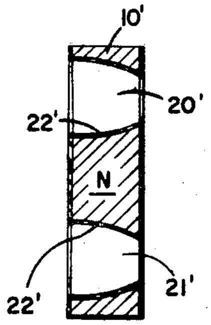
FIGURES 11 to 18 illustrate in various stages of fabrication the production of isolated semiconductor segments of opposite conductivity type in a monolithic-like crystalline substrate by a second process.
Figure 12:
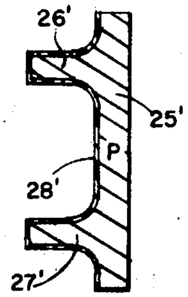

The first step after selecting the N and P-type single-crystal wafers 10′ and 25′, illustrated by FIGURES 11 and 12, is to produce holes 20′ and 21′ in the N-type wafer 10′ and to produce mesas 26′ and 27′ in the P-type semiconductor wafer 25′. Both wafers are then oxidized to provide an insulating film 22′ all over the N-type wafer, including the holes, and an insulating film 28′ on at least the mesa side of the P-type wafer.

Figure 13:
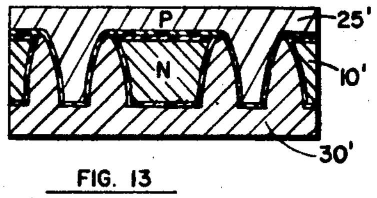
Figure 14:
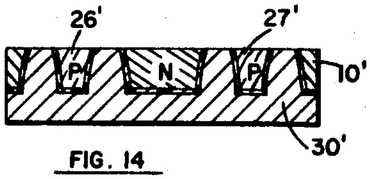

The next step illustrated by FIGURE 13 is analogous to the step of the first process illustrated by FIGURE 8, which is to place the mesas of the P-type wafer 25′ in the holes of the N-type wafer 10′ and to join the two wafers by depositing an isolating material 30′ in the holes around the mesas. A portion of the P-type wafer 25′ is then removed, thereby exposing the isolating material around the mesas 26′ and 27′ as illustrated in FIGURE 14, and more fully illustrated by FIGURE 15 which shows in a top view of the structure of FIGURE 14 the tops of the isolated mesas 26′ and 27′ surrounded by isolating material 30′.

Figure 15:
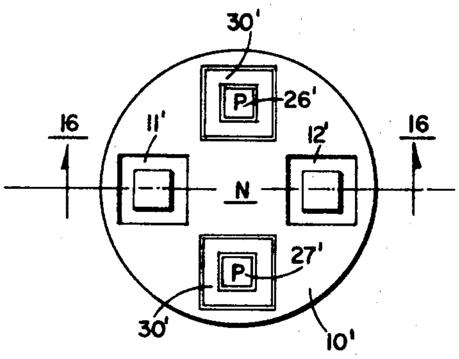
Figure 16:
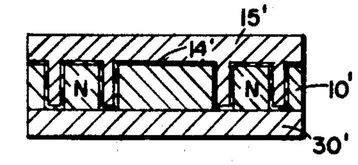
Figure 18:
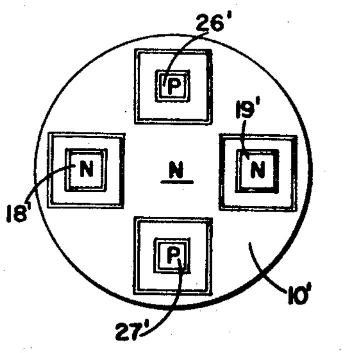
Figure 17:
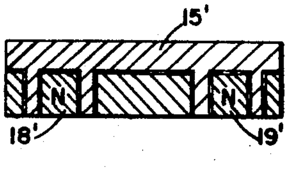

The last step is to isolate in the monolithic-like crystalline structure of FIGURE 15 segments of the N-type wafer 10′. That is accomplished by producing isolating channels 11′ and 12′ in the N-type wafer in an arbitrary pattern of the isolated segments desired as shown in FIGURE 15. The next operation in isolating segments of the N-type wafer 10′ is to oxidize the surface to provide an insulating film 14′ and then deposit isolating material 15′ as shown in FIGURE 16 in the same manner as in the steps of the first process illustrated in FIGURE 3. A portion of the resulting structure on the opposite side of the channels is then removed until the isolating material 15′ in the channels is exposed on that side, the obverse side of the final structure, as illustrated in FIGURE 17. That obverse side is shown in FIGURE 18 which corresponds to the final structure of the first process illustrated in FIGURE 10.

While the principles of the invention have now been made clear in two illustrative embodiments, there will be immediately obvious to those skilled in the art many modifications in structure, arrangement, processes, proportions and materials. For example, the single-crystal semiconductor segments may be cut from crystals grown epitaxially as well as by other known methods, or combination of methods. Such single-crystal segments may initially include low-resistivity $N^+$ of $P^+$ layers, or layers of opposite conductivity. The appended claims are therefore intended to cover and embrace any such modifications, within the limits only of the true spirit and scope of the invention.

What is claimed is:

1. A process for joining single-crystal semiconductor segments of opposite conductivity in a monolithic-like crystalline structure comprising the steps of selecting two single-crystal semiconductor wafers of opposite conductivity types, producing an arbitrarily selected pattern of holes in the semiconductor wafer of one conductivity type and a corresponding array of mesas in the semiconductor wafer of the other conductivity type, placing said mesas in said holes, joining the opposite conductivity type semiconductor wafers by deposited isolating crystalline material around said mesas in said holes; removing a portion of semiconductor of the other conductivity type until the isolating material between the two types of semiconductors is exposed, whereby the mesas become isolated segments of the other conductivity type semiconductor, and, as a separate operation, isolating segments of the one conductivity type semiconductor in an arbitrarily selected pattern by producing isolating channels in said one conductivity type semiconductor in said desired pattern, depositing isolating material in said channels and removing a portion of the resulting structure on the opposite side of said channels until the isolating material in said channels is exposed on that side of the resulting structure.

2. A process as defined by claim 1 wherein the operation of isolating segments of the one conductivity type is performed before the steps defined for isolating segments of the other conductivity type in a monolithic-like crystalline structure.

3. A process as defined in claim 1 wherein said operation of isolating segments of the one conductivity type is performed after the steps defined for isolating segments of the other conductivity type in a monolithic-like crystalline structure.

4. A process for joining single-crystal semiconductor segments of opposite conductivity in a monolithic-like crystalline structure comprising the steps of selecting two single-crystal semiconductor wafers of opposite conductivity types, producing a pattern of holes in a first wafer of one conductivity type and a corresponding pattern of mesas in a second wafer of the other conductivity type, providing an electrically insulating film on the surfaces of the mesas and the holes, positioning said mesas in said holes, depositing isolating material around said mesas in said holes, thereby joining said two wafers with isolating material, removing a part of said second wafer to expose the isolating material around the mesas, thereby providing isolated segments of said second wafer embedded in a monolithic-like crystalline structure, and isolating segments of the first wafer in said structure with isolating material deposited around said segments by producing isolating channels in said first wafer in said desired pattern, depositing isolating material in said channels and removing a portion of the resulting structure on the opposite side of said channels until the isolating material in said channels is exposed on that side of the resulting structure.

5. A process as defined in claim 4 wherein said operation of isolating segments of the first wafer is performed before the steps defined for isolating segments of the second wafer in a monolithic-like crystalline structure.

6. A process as defined in claim 4 wherein said operation of isolating segments of the first wafer is performed after the steps defined for isolating segments of the second wafer in a monolithic-like crystalline structure.

References Cited

UNITED STATES PATENTS

| | | | |
|---|---|---|---|
| 3,247,428 | 4/1966 | Perri et al. | |
| 3,264,714 | 8/1966 | Baer | 29—573 |
| 3,290,753 | 12/1966 | Chang | 29—577 |

WILLIAM I. BROOKS, *Primary Examiner.*